US011148541B2

United States Patent
Hom et al.

(10) Patent No.: US 11,148,541 B2
(45) Date of Patent: Oct. 19, 2021

(54) LOCATING AN ELECTRIC VEHICLE AT A CHARGING STATION

(71) Applicant: Proterra Inc., Burlingame, CA (US)

(72) Inventors: Jason Hom, San Francisco, CA (US); Hayley Cashdollar, San Mateo, CA (US); Dustin Grace, San Francisco, CA (US)

(73) Assignee: PROTERRA INC., Burlingame, CA (US)

( * ) Notice: Subject to any disclaimer, the term of this patent is extended or adjusted under 35 U.S.C. 154(b) by 107 days.

(21) Appl. No.: 16/228,918

(22) Filed: Dec. 21, 2018

(65) Prior Publication Data

US 2020/0039370 A1 Feb. 6, 2020

Related U.S. Application Data

(60) Provisional application No. 62/712,754, filed on Jul. 31, 2018.

(51) Int. Cl.
*B60L 53/36* (2019.01)
*B60L 53/14* (2019.01)
*B60M 7/00* (2006.01)
*H02J 7/00* (2006.01)

(52) U.S. Cl.
CPC .............. *B60L 53/36* (2019.02); *B60L 53/14* (2019.02); *B60M 7/003* (2013.01); *H02J 7/0027* (2013.01); *B60L 2250/16* (2013.01); *H02J 7/0045* (2013.01); *Y02T 90/12* (2013.01)

(58) Field of Classification Search
CPC ....... H02J 7/0027; H02J 7/0045; B60L 53/14; B60L 53/36; B60L 2250/16
USPC ......................................... 320/104, 107, 109
See application file for complete search history.

(56) References Cited

U.S. PATENT DOCUMENTS

| | | | |
|---|---|---|---|
| 8,324,858 B2 | 12/2012 | Hill et al. | |
| 9,315,111 B1 | 4/2016 | McGrath et al. | |
| 9,352,658 B2 | 5/2016 | Morris et al. | |
| 9,776,520 B2 | 10/2017 | Shah | |
| 10,243,415 B1* | 3/2019 | Grundmann | H02J 50/05 |
| 2016/0129794 A1* | 5/2016 | Huang | B60L 53/12 |
| | | | 320/108 |
| 2017/0136911 A1* | 5/2017 | Ricci | B60L 53/63 |
| 2019/0184841 A1* | 6/2019 | Van Wiemeersch | B60L 53/36 |

* cited by examiner

*Primary Examiner* — Edward Tso
*Assistant Examiner* — Aaron Piggush
(74) *Attorney, Agent, or Firm* — Bookoff McAndrews, PLLC

(57) ABSTRACT

A method of locating an electric vehicle at a charging station having multiple chargers is includes, receiving at multiple fixed transceivers positioned at different locations in the charging station, signals from the electric vehicle as the electric vehicle moves in the charging station, and determining, at a controller, a current location of the electric vehicle in the charging station using the signals received by the multiple fixed transceivers.

19 Claims, 5 Drawing Sheets

LOCATING AN ELECTRIC VEHICLE AT A CHARGING STATION

CROSS-REFERENCE TO RELATED APPLICATIONS

This application claims the benefit of U.S. Provisional Application No. 62/712,754, filed Jul. 31, 2018, the disclosure of which is incorporated herein by reference in its entirety.

TECHNICAL FIELD

Embodiments of this disclosure relate to systems and methods for locating and/or tracking an electric vehicle at a charging station.

BACKGROUND

Electric vehicles, such as electric buses, electric cars, electric trucks, etc. are charged using power from a utility grid to recharge their batteries. In some applications, when an electric vehicle is driven and parked proximate a charger, a charge head (with charging electrodes) of the charging station makes contacts with and directs power to the vehicle for charging. In some such cases, it is desirable for the electric vehicle to be parked at a particular position relative to the charge head so that the charging electrodes of the charge head can readily make contact with the charge-receiving electrodes of the vehicle. Typically, the driver of the electric vehicle drives the vehicle to the target location (based on, for example, visual markers such as a line on the road to indicate the path, markers which indicate location, etc.) and parks the vehicle at the target location prior to charging. However, such an approach may be error prone and may depend upon the experience of the driver to accurately park the vehicle at the target location. In some cases, multiple attempts may be needed for suitably positioning the electric vehicle at the target location of the charging station for charging. Embodiments of the current disclosure may address these limitations and/or other problems in the art.

SUMMARY

Embodiments of the present disclosure relate to, among other things, systems and methods for controlling and/or locating and/or guiding an electric vehicle at a charging station. Each of the embodiments disclosed herein may include one or more of the features described in connection with any of the other disclosed embodiments.

In one embodiment, a method of locating an electric vehicle at a charging station having multiple chargers is disclosed. The method may include, receiving at multiple fixed transceivers positioned at different locations in the charging station, signals from the electric vehicle as the electric vehicle moves in the charging station, and determining, at a controller, a current location of the electric vehicle in the charging station using the signals received by the multiple fixed transceivers.

In another embodiment, a method of assigning electric vehicles to chargers at a charging station is disclosed. The method may include receiving, at multiple fixed transceivers positioned at different locations in the charging station, signals from each electric vehicle of multiple electric vehicles arriving at the charging station, and determining, at a controller, the current location of each electric vehicle of the multiple electric vehicles based on the signals received from each electric vehicle. The method may also include routing each electric vehicle to a separate charger of multiple chargers in the charging station based at least on the signals received from each electric vehicle.

In yet another embodiment, a charging station is disclosed. The charging station may include multiple chargers configured to charge electric vehicles, multiple fixed transceivers positioned at different locations in the charging station, and a charge controller. Each fixed transceiver may be configured to receive signals from each electric vehicle of the multiple electric vehicles, and charge controller may be configured to determine a current location of an electric vehicle of the multiple electric vehicles in the charging station based on the signals received by the multiple fixed transceivers.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Figure 1A:
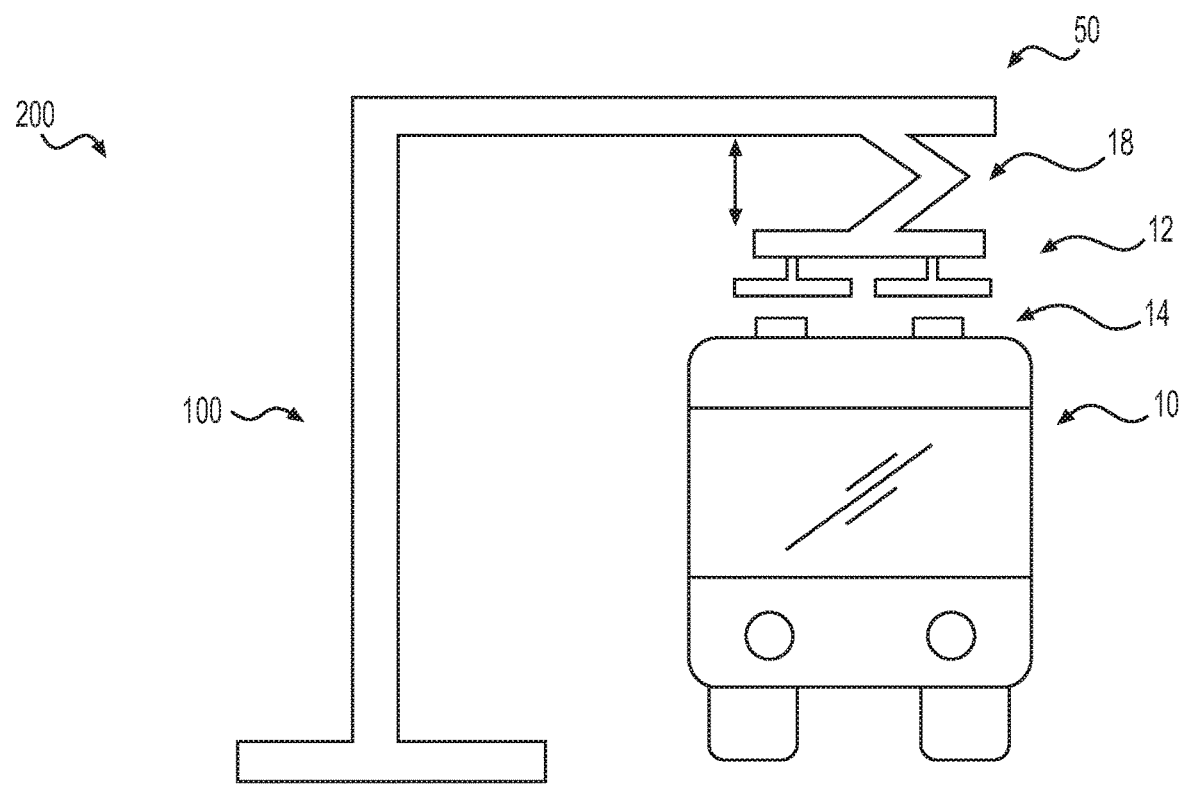
FIGS. 1A and 1B illustrate exemplary chargers for an electric vehicle.

The present disclosure describes systems and methods for locating, controlling, and/or guiding an electric vehicle to a charger at a charging station. While principles of the current disclosure are described with reference to an electric bus, it should be understood that the disclosure is not limited thereto. Rather, the systems and methods of the present disclosure may be used for controlling, locating, and/or guiding any electric vehicle at a charging station. The systems and methods of the current disclosure may also be applied to guide any mobile electrical device or appliance to a charging dock for charging. As used herein, the term "electric vehicle" is used to refer to any vehicle or transport machine that is driven at least in part by electricity (e.g., hybrid vehicles, all-electric vehicles, etc.). And, the term "charging station" is used to refer to any area that includes one or more chargers configured to charge electric vehicles. For example, as used herein, a "charging station" includes a depot, parking area, yard, garage, etc. used to park electric vehicles and includes one or more chargers to charge these electric vehicles. The term "charging station" also includes rest areas (e.g., on a highway) and other such temporary stopping locations that include one or more chargers where electric vehicles may pull into for charging.

Although the current disclosure is broadly applicable to any type of electric vehicle that may be charged in any manner (e.g., conductively, inductively, etc.), an exemplary embodiment of an electric bus that is conductively charged using charge-receiving electrodes positioned on its roof is described below. As will be explained below, in some exemplary embodiments, such an electric bus may be charged at a charger (in a charging station) having a charge head that overhangs the roof of the bus. The charge head includes charging electrodes that make contact with the charge-receiving electrodes on the bus roof and direct power to the bus during charging. The power directed into the bus from the charge head is used to recharge the battery system of the bus. In the case of a large fleet of buses (such as, for example, a fleet of electric buses that service a city, airport, etc.), multiple buses may be simultaneously charged at a charging station that have multiple chargers each configured to a charge a bus. In such a case, multiple buses may pull into the charging station at the same time for charging. The systems and methods discussed below may assist the driver or operator of the buses in accurately directing the buses to the chargers and/or positioning the buses at a target location proximate the charger (e.g., parking a bus at a charger such that they are suitably aligned for charging) in a repeatable manner without having to make multiple attempts for proper alignment. Reducing the effort needed for proper alignment of the bus during charging may reduce the costs associated with charging (such as, for example, by decreasing number of chargers needed, decreasing utility costs, increasing the number of buses that can be charged in the available area, etc.) and increase operational efficiency (e.g., reduce the time needed for charging, etc.).

Figure 1B:
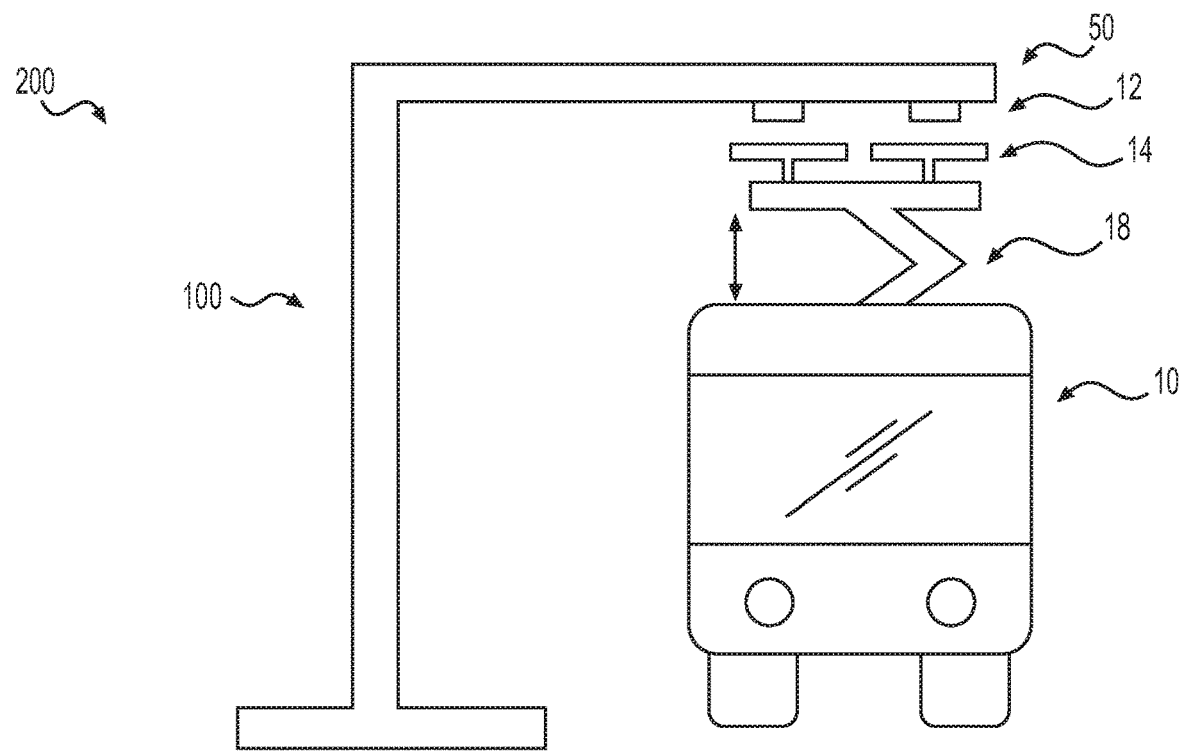

FIGS. 1A and 1B illustrate an electric bus 10 positioned below a charge head 50 of a charger 100 located in a charging station 200. In some embodiments, charging station 200 may include multiple such (or other types of) chargers 100. Charger 100 includes charging electrodes 12 and the bus 10 includes charge-receiving electrodes 14. As illustrated in FIG. 1A, in some embodiments, the charging electrodes 12 may be positioned on an inverted pantograph 18 attached to the charge head 50 and the charge-receiving electrodes 14 may be stationary electrodes attached to the roof of the bus 10. In some embodiments, as illustrated in FIG. 1B, the charge-receiving electrodes 14 may be positioned on a pantograph 18 attached to the roof of the bus 10 and the charging electrodes 12 may be attached to the charge head 50. In either case, when the bus 10 is suitably positioned below the charge head 50, the pantograph 18 is activated to move the charging electrodes 12 and the charge-receiving electrodes 14 towards each other and make contact with each other. In the embodiment of FIG. 1A, the pantograph 18 is activated to lower the charging electrodes 12 towards the roof to make contact with the charge-receiving electrodes 14. And, in the embodiment of FIG. 1B, the pantograph 18 is activated to raise the charge-receiving electrodes 14 from the roof to make contact with the charging electrodes 12. When suitable contact is established between the charging and charge-receiving electrodes 12, 14, current is directed from the charger 100 to the bus 10 charge the batteries of bus 10.

It should be noted that the charging arrangement described above with reference to FIGS. 1A and 1B (e.g., the roof-top charge-receiving electrodes 14, the overhanging charging electrodes 12, and the pantograph-type system) is only exemplary, and the current disclosure is broadly applicable to any type of charging arrangement. It should also be noted that the configuration of the charging and charge-receiving electrodes 12, 14 illustrated in FIGS. 1A and 1B are also exemplary. In general, the charging and charge-receiving electrodes 12, 14 may have any configuration and may be oriented with respect to each other in any manner (e.g., arranged parallel to each other, arranged transverse to each other, etc.). Any number of charging and charge-receiving electrodes 12, 14 may be provided. In some embodiments, the charging and charge-receiving electrodes 12, 14 may include a positive terminal, a negative terminal, a ground terminal, and a control terminal. The positive and negative terminals may serve as terminals for the positive and negative current signals, the ground terminal may serve as the system ground, and the control terminal may be used for communication signals between the bus 10 and the charger 100 during charging. In some embodiments, the number of the charging and charge-receiving electrodes 12, 14 may be the same and a separate charging electrode 12 may contact with a separate charge-receiving electrode 14 during charging. U.S. Pat. Nos. 8,324,858; 9,352,658; and PCT Application PCT/US2018/054649, filed Oct. 5, 2018, incorporated by reference in their entireties herein, describe exemplary chargers and exemplary configurations of charging and charge-receiving electrodes.

The process of physically contacting the charging and charge-receiving electrodes 12, 14 during charging is referred to as docking. Whatever the configuration of the charging and charge-receiving electrodes, the bus 10 should be suitably positioned at the charger 100 for the charging and charge-receiving electrodes 12, 14 to make contact with each other during docking. For example, with reference to the embodiment of FIG. 1A, the bus 10 has to be positioned under the charge head 50 such that when the pantograph 18 is activated to lower the charging electrodes 12 on to the roof, the charging electrodes 12 should land on the charge-receiving electrodes 14 and not on another region of the roof. If the bus 10 is not suitably positioned under the charge head 50, the bus 10 will have to repositioned and docking attempted again. In some embodiments, the disclosed system may guide the driver of the bus 10 (or another operator of the bus) to a charger 100 of a charging station 200 and assist the driver in parking the bus 10 at a target location (e.g., under the charge head 50) proximate the charger 100.

Figure 2A:
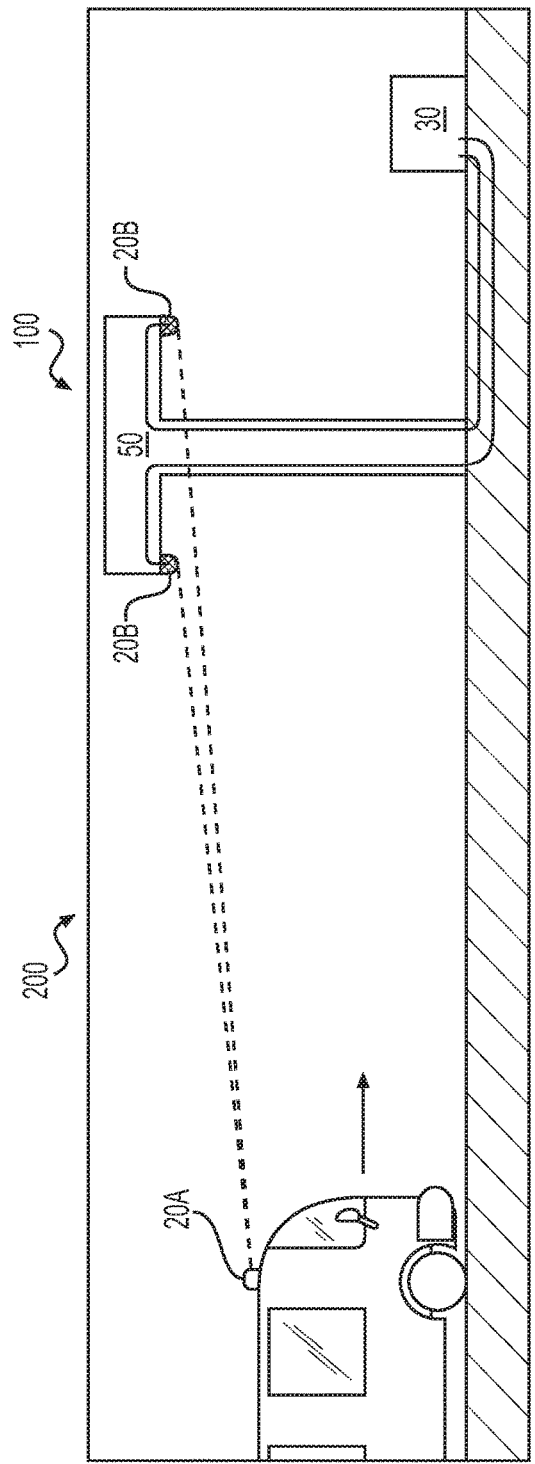
FIGS. 2A and 2B are schematic illustrations of an exemplary driver assistance system of the current disclosure.

FIG. 2A is a schematic illustration of an exemplary driver assistance system that assists in guiding the bus 10 to a charger 100 in a charging station 200. As illustrated in FIG. 2A, the system may include multiple sensors or transceivers 20B located at different fixed locations in the charging station 200 and one or more sensors or transceiver 20A located on the bus 10. The transceivers 20A, 20B may include any type of device that can both transmit and receive communications (e.g., a combined radio transmitter and receiver). In the description below, the transceivers of the charging station are referred to as fixed transceivers 20B and the transceiver(s) located on the bus 10 are referred to as mobile transceiver 20A. Although, in general, any type of transceivers 20A, 20B may be used, in some embodiments, the mobile and the fixed transceivers 20A, 20B are both ultra-wideband (UWB) transceivers. Unlike WiFi and some other communication technologies, UWB is suitable for precise location tracking (e.g., ≤20 cm, ≤10 cm, ≤5 cm, etc.), such as, in a real-time position tracking system. Thus, embodiments where both fixed and mobile transceivers 20A, 20B are UWB transceivers (referred to below as UWBs) may be preferred embodiments.

As schematically illustrated in FIG. 2A, the transceivers 20B of the charging station 200 may be operationally connected to a charge controller 30. The transceivers 20B may be connected to the charge controller 30 in any manner (wired connection, wireless connection, etc.). The charge controller 30 may be any controller (located at the charging station or at a remote location) that controls one or more aspects of charging. In general, any number (e.g., 2, 3, 4, 6, 8, 10, etc.) of transceivers 20B may be positioned at fixed locations in the charging station 200. And, any number of UWB transceivers 20A may be positioned on the bus 10. In some embodiments, multiple fixed UWB transceivers 20B may positioned at different locations on the charging station 200 and a single transceiver 20A may be positioned on the bus 10. The transceiver(s) 20A may be positioned at any location on the bus 10. Although not a requirement, in some embodiments, as illustrated in FIG. 2A, a UWB transceiver 20A on the bus 10 may be positioned on the roof at a location close to the front of the bus 10. U.S. Pat. Nos. 9,776,520 and 9,315,111 incorporated by reference herein in their entireties, describe some exemplary arrangements of sensors in charging stations and electric vehicles.

Figure 2B:
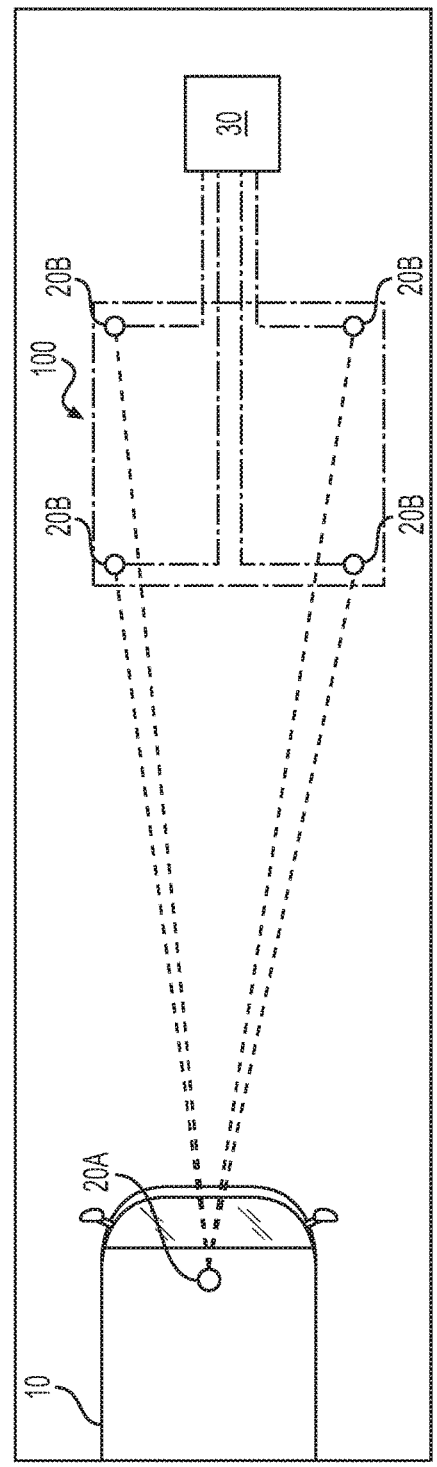

As illustrated in FIG. 2B, the fixed transceivers 20B in the charging station 200 may be arranged in any pattern (e.g., in a grid, rectangular, or another suitable pattern, etc.) and may be mounted anywhere (e.g., on a pole, roof-top of buildings, on the chargers 100, etc.) in the charging station 200. In some embodiments, the mobile and fixed transceivers 20A, 29B may be positioned such that the line-of-sight of some or all of the fixed transceivers 20B to a mobile transceiver 20A of an approaching bus is not obstructed (e.g., by structures of the charging station, features of the bus, etc.). In some embodiments, the fixed transceivers 20B of the charging station 200 may be beacons which constantly receive data. When a bus 10 enters the zone of coverage of the fixed transceivers 20B of the charging station 200, at least some of the fixed transceivers 20B detect the signals from the mobile transceivers 20A of the bus 10 and thus detect the presence of the bus 10. Based on the signals received by the multiple fixed transceivers 20B, the charge controller 30 (which receives signals from the fixed transceivers 20B) accurately locates (or pinpoints) the location of the bus 10 in the charging station 200. As the bus 10 moves in the charging station 200, the fixed transceivers 20B receive updated signals from the mobile transceiver(s) 20A on the bus 10. Based on the signals received by the fixed transceivers 20B, the charge controller 30 may track the path travelled by the bus 10 in the charging station 200 (e.g., by time-of-flight, triangulation, etc.). Thus, the fixed transceivers 20B communicate with the mobile transceiver(s) 20A to detect and track the approach of the bus 10 towards the charger 100 in a real-time manner.

Figure 3:
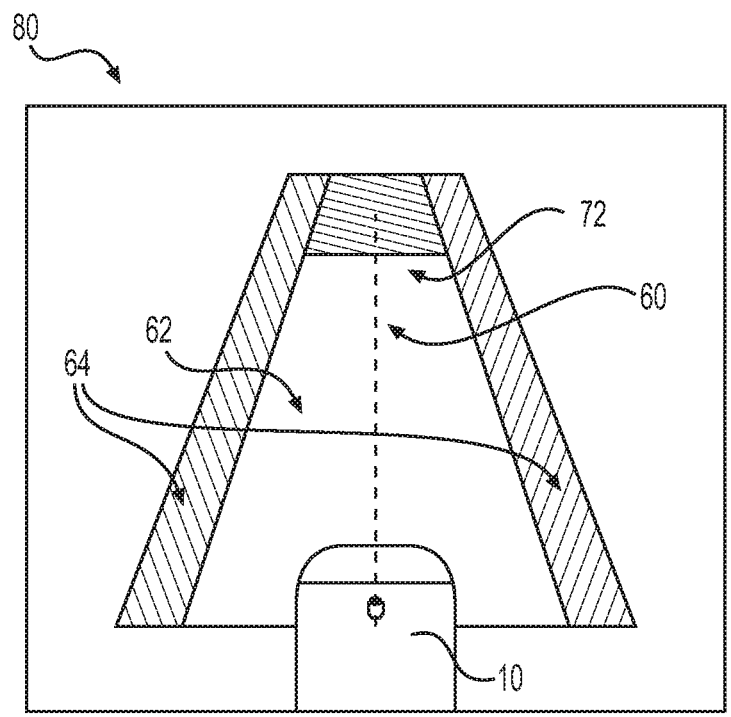
FIG. 3 is a schematic illustration of an exemplary driver assistance display of the current disclosure.

Data related to the position of the bus 10 in the charging station 200 (e.g., relative position of the bus 10 with respect to a charger 100, path of the bus 10 towards the charger 100, etc.) may be used to guide the driver of the bus 10 to the target location (e.g., below the charge head of a charger 100, etc.) in the charging station 200. In some embodiments, bus 10 may include a display that guides the driver to the target location. FIG. 3 illustrates an exemplary display that may be displayed to the driver in a display system 40 of the bus 10. The display system 40 may be positioned on the dash, windshield (such as a HUD, heads up display) or at another location which is visible to the driver. In some embodiments, the mobile transceiver(s) 20A of the bus 10 may be constantly on and transmitting data. In some embodiments, the driver may activate the mobile transceiver(s) 20A when the bus 10 approaches or enters the charging station. In some embodiments, the charge controller 30 of the charging station 200 may activate the mobile transducers 20A based on the location of the bus 10 in the charging station 200. In some embodiments, activation of the mobile transceiver(s) 20A may also activate the display system 40. The display system 40 may present a driver interface to the driver that assists the driver in positioning the bus for charging. As illustrated in FIG. 3, the driver interface may include a map that displays the current location of the bus 10 in the charging station 200 and/or a suggested path 60 of the bus to a charger 100 in the charging station 200. The bus location and the suggested path 60 may be determined based on the signals received by the fixed transceivers 20B of the charging station 200. In some embodiments, the driver interface may be displayed on an existing display system of the bus 10. It should be noted that the display system 40 and the display depicted in FIG. 3 are only exemplary. As would be recognized by a person skilled in the art, any type of a display that provides assistance for the driver to navigate to a charger 100 may be used.

Based on data from the mobile and fixed transceivers 20A, 20B, the charge controller 30 may send to the bus 10, the current coordinates of the bus 10 (e.g., x, y coordinates of the where the bus 10 is at that moment) and the target coordinates (e.g., x, y coordinates of the target location 72 where the bus is guided to). In some embodiments, the charge controller 30 may also calculate and send to the bus 10, the suggested path 60 for the bus 10 to travel from the current location to the target location 72. The received data may be displayed on the display system 40. As explained above, the target coordinates may correspond to the target location 72 that the bus 10 is being directed to (e.g., under the charge head of a charger 100). The target coordinates and/or the suggested path 60 may be periodically updated based on new information received by the charge controller 30. For example, if a more suitable charger 100 (closer charger, etc.) along the path travelled by the bus 10 becomes free, etc., as the bus 10 is travelling towards a charger 100. The target coordinates, the current location, and the suggested path 60 on the display interface may be updated (in a real-time manner or periodically at any desired frequency) to track the path of the bus 10 towards the target location 72. In some embodiments, as shown in FIG. 3, the charge controller 30 may also calculate and display a zone of allowable paths (allowable zone 62) that the bus 10 can take towards the target location 72. In some embodiments, the display may also include an out-of-bounds zone 64 outside the allowable zone 62. The driver may use the display as a guide to navigate the bus 10 towards the target location 72. When the driver veers off the allowable zone 62 (e.g., into the out-of-bounds zone 64), the charge controller 30 (or another controller of bus 10) may alert the driver and prompt the driver to return to the indicated path. In some embodiments, these alerts may be provided on the driver interface in the display system (e.g., lights, changing colors, sound, etc.).

Figure 4:
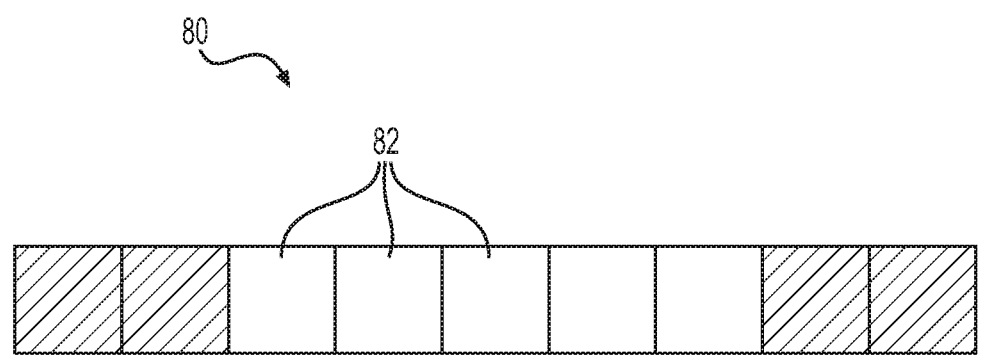
FIG. 4 is an illustration of indicator lights used in an exemplary driver assistance system of the current disclosure.

Additionally or alternatively, in some embodiments, other visual and/or audio clues may assist the driver in guiding the bus 10 towards the target location 72. Providing such additional clues may assist in relaying information to drivers without them having to take their eyes off the road). For example, if the bus 10 veers outside the allowable zone 62, indicator lights and/or beeps may be used to prompt the driver to navigate back to the allowable zone 62 (i.e., the indicated or preferred path). As shown in FIG. 4, in some embodiments, the indicator lights 80 may include a series of colored LEDs 82 that selectively light up to indicate the alignment of the bus 10 with respect to the target location 72. For example, a green light may indicate that the bus 10 is in the allowable zone 62, and a red light to the side of the green light may indicate that the bus is outside the allowable zone 62. The audio signals may include, a sound for when the bus is in the allowable zone 62, a different sound for when the bus is outside the allowable zone 62, etc. Using the display in the display interface (and/or the audio signals or indicator lights), the driver may guide the bus 10 towards the target location 72. It should be noted that the arrangement of lights illustrated in FIG. 4 is only exemplary. In general, any type of visual indicator that assists the driver in navigating the bus 10 to the target location 72 may be used. It is also contemplated that, in some embodiments, the charge controller 30 may autonomously (e.g., with no control or minimal control of the driver) guide the bus 10 to the target location 72. For example, the charge controller 30 (e.g., in coordination with controller(s) in the bus 10) may steer the bus 10 so that it stays on the indicated path.

Figure 5B:
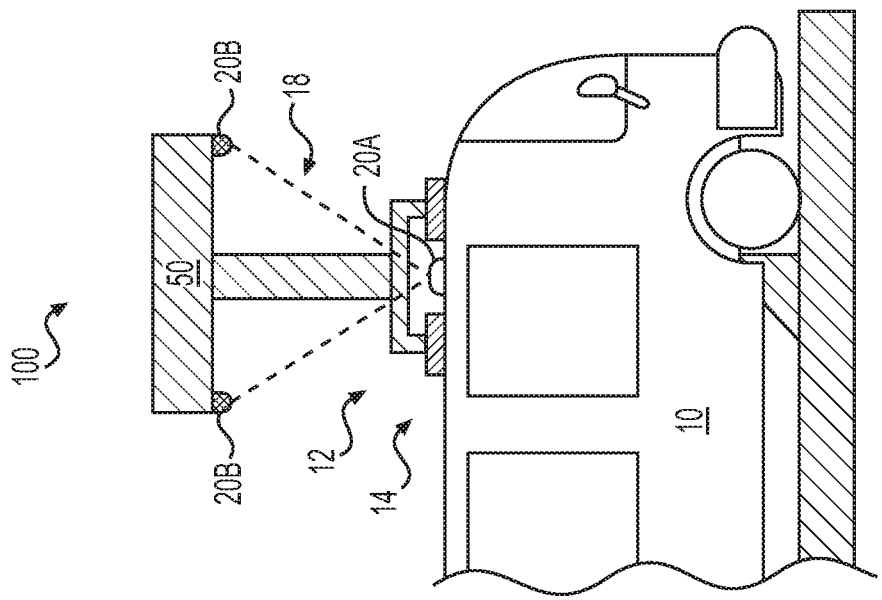
FIGS. 5A and 5B are schematic illustrations of positioning an electric vehicle at a target location near a charger in an exemplary embodiment.
Figure 5A:
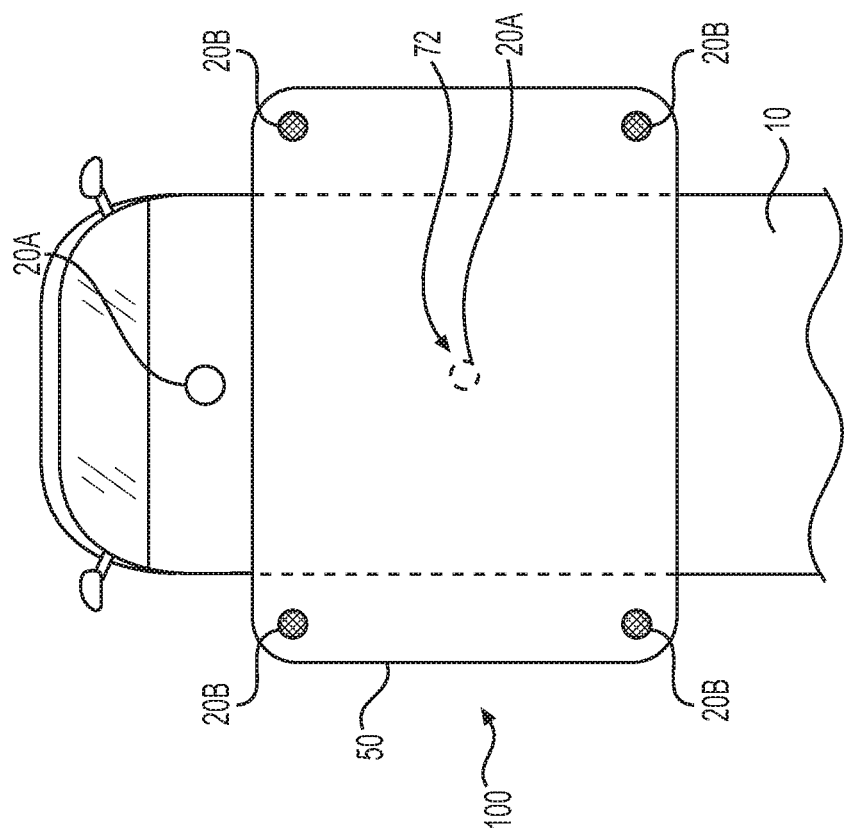

In some embodiments, as illustrated in FIGS. 5A and 5B, when the bus 10 reaches the target location 72, transceivers 20B (or other sensors) of the charging station 200 (e.g., mounted on or around the charger 100) and/or transceivers 20A of the bus 10 may assist or guide the driver to precisely position the bus at the target location 72. For example, audio signals and/or indicator lights may be used to indicate to the driver that the bus is approaching (and is at) the target location 72. With reference to FIGS. 1A and 1B, when positioned at the target location 72, the bus 10 and the charger 100 may be aligned such that the charging electrodes 12 of the charger 100 readily make contact with the charge-receiving electrodes 14 of the bus 10. It is also contemplated that, in some embodiments, the charge controller 30 may perform some or all aspects of the precise positioning autonomously. For example, the charge controller 30 (alone or in coordination with other controller(s) on the bus 10) may steer the bus 10 and/or apply its brakes to precisely position the bus at the target location 72.

In some embodiments, the charge controller 30 may activate and/or deactivate some features of the bus 10 and/or the charger 100 (or the charging station 200) based on data from the mobile and/or the fixed transceivers 20A, 20B. For example, the charge controller 30 may be configured for geofencing, in that triggers an action (on the bus 10, the charger 100, or the charging station 200) when a bus 10 enters a location or region in the charging station 200. For example, in some embodiments, high voltage circuits that provide power to a charger 100 may only be activated based on the relative position of the bus 10 with respect to the charger 100 (or the relative position of the bus 10 with respect to another location (e.g., buildings, markers, land marks, etc.) of the charging station 200), or when the bus 10 enters a designated area of the charging station 200. Similarly, the pantograph 18 (see FIGS. 1A and 1B) may be raised or lowered for docking only when the bus 10 is at a desired location with respect to the charger 100, the doors of the bus 10 opened when the bus has stopped, etc. In some embodiments, the charge controller 30 may also send instructions to the bus 10 (e.g., to the driver) to activate systems of the bus 10 based on, for example, its location relative to the target location 72. For example, the charge controller 30 may instruct the driver to approach the target location 72 at a particular speed, put the bus 10 in park, open the passenger door, activate/deactivate HVAC, etc., based on the relative position of the bus 10 with respect to the target location 72. It is also contemplated that, in some embodiments, the charge controller 30 may autonomously activate some or all of the above described (or other) bus features without input from (or with minimal input from) the driver. For example, in some embodiments, based on the location of the bus 10 in the charging station 200 (or when the bus enters a predetermined zone, etc.), the charge controller 30 may control the speed of the bus 10 (e.g., speed limit).

In some embodiments, when the bus is in a predetermined area of the charging station 200, approaching a charger 100, parked at the target location 72, etc. (i.e., before the bus 10 physically docks with the charger 100), a "handshake" may begin between the bus 10 and the charger 100 or the charging station 200 (e.g., the charge controller 30). In some embodiments, communications or data transfer between the bus 10 and the charge controller 30 happen via the mobile and fixed transceivers 20A, 20B. That is, in some embodiments, the mobile and fixed transceivers 20A, 20B may be used for both communications (or data exchange) between the bus 10 and the charge controller 30 and for location determination. During the "handshake," the charge controller 30 may determine factors related to charging. For example, based on data transferred between the mobile and fixed transceivers 20A, 20B, the charge controller 30 may determine: compatibility between the bus 10 and the chargers 100 in the charging station 200 (e.g., which of many chargers 100 in the charging station 200 are configured to or most suited for charging the bus 10); if the bus 10 is to be charged at the charging station 200 (e.g., if the state of charge, destination, route, next scheduled charging, etc.) of the bus is such that charging is not needed); if a charger 100 is free to charge the bus 10 (e.g., if all chargers 100 are being currently used); if the charger 100 is ready for charging; if the bus 10 is ready to be charged (e.g., is the bus in park, etc.), etc. For example, the charge controller 30 may determine which chargers 100 (if any) in the charging station 200 the approaching bus 10 is compatible with and then direct the bus 10 to that charger 100. Information related to charging (e.g., SOC of bus, route of bus, passenger info, next stop, etc.) may also be exchanged between the charge controller 30 and the bus 10 before docking (e.g., via the mobile and fixed transceivers 20A, 20B).

The charge controller 30 may also receive data from the chargers 100 (periodically or in a real-time manner) in the charging station 200. This information may include information such as, for example, if a charger 100 is free to charge a bus 10, whether it is operational, etc. In some embodiments, the charge controller 30 may also receive information from the utility company (energy rate, demand charges related information, such as, e.g., amount of energy that has already been consumed by the chargers of the charging station in a time period used to calculate the demand rate, etc.). Using some or all of the data from the chargers 100, utility company, and the bus 10 (e.g., position data from the mobile and fixed transceivers 20A, 20B, data exchanged between bus and charging station, handshake, etc.), the charge controller 30 may make several decisions and determine several parameters (or factors) related to charging. For example, the charge controller 30 may determine: whether the bus should be charged or not (e.g., if the bus ID matches information in its database, etc.); how much energy to charge the bus 10 (e.g., based on current SOC of bus, if there is enough retained energy to make it to the next stop, if the bus 10 is already late, HVAC needs, etc.); which charger 100 to charge the bus 10 at (e.g., in case there are multiple chargers 100 in the charging station 200, the charge controller 30 may determine which particular charger to direct the bus 10 to, etc.); rate (charging rate) at which energy should be directed into the bus 10 during charging.

Figure 6:
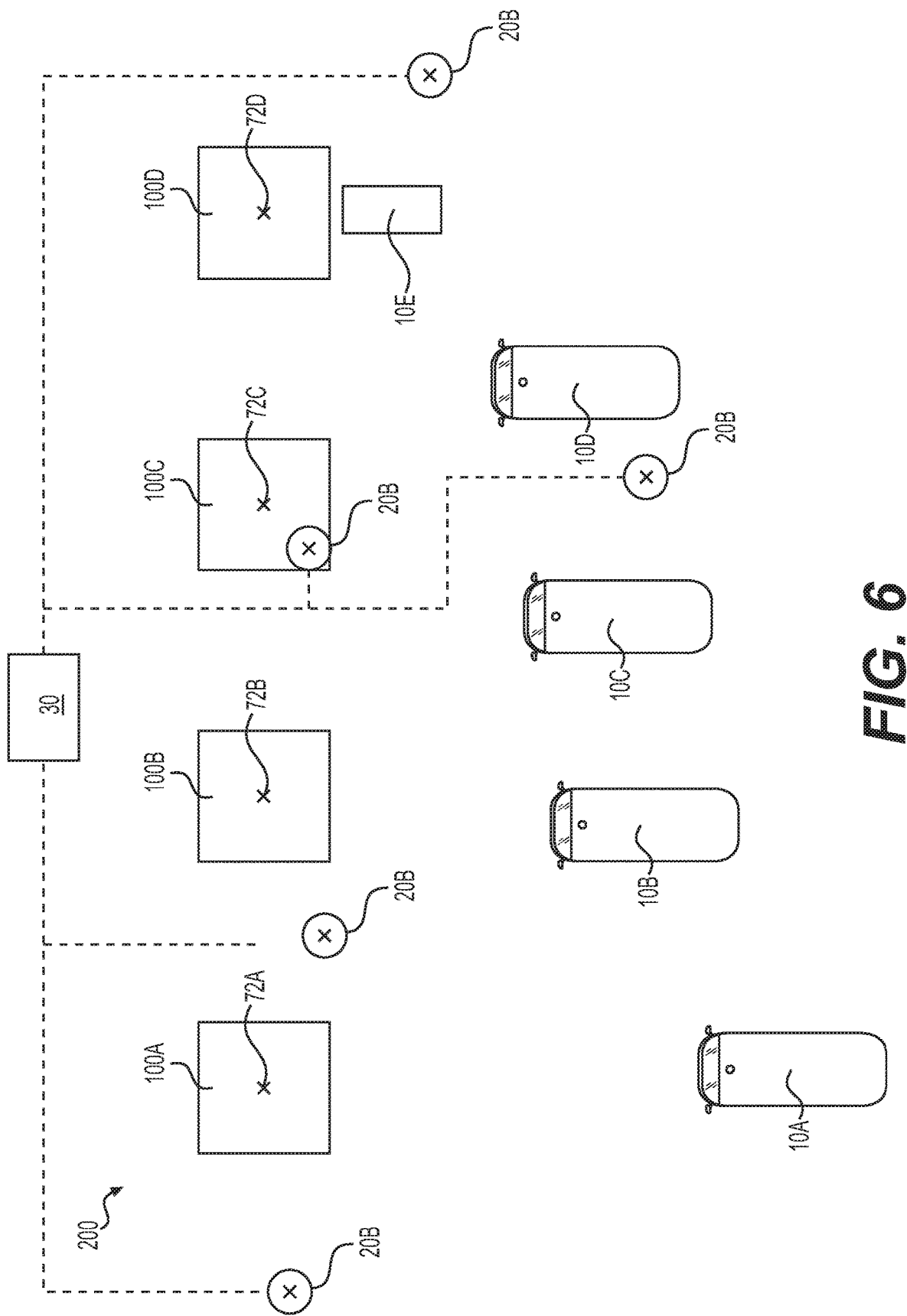
FIG. 6 is a schematic illustration of multiple electric vehicles arriving at a charging station for charging in an exemplary embodiment.

FIG. 6 illustrates an exemplary embodiment where a charging station 200 includes multiple chargers 100A, 100B, 100C, 100D in different charging areas. These multiple chargers 100A, 100B, 100C, 100D may be used to simultaneously charge several buses 10A, 10B, 10C, 10D, 10E (or other EVs). In some such embodiments, the charge controller 30 may use data from the fixed transceivers 20B in the charging station 200 and mobile transceivers 20A of the buses 10A-10E to locate and track the position of each bus 10A-10E in a real-time (or periodic) manner, and direct each bus 10A-10E to a suitable charger (e.g., the closest charger, a free charger, etc.). That is, with reference to FIG. 6, bus 10A may be specifically directed to target location 72A proximate charger 100A, bus 10B may be specifically directed to target location 72B proximate charger 100B, etc. Based on interaction between the fixed and mobile transceivers 20B, 20A, the charge controller 30 may determine exactly (e.g., ≤5 centimeter accuracy, etc.) where each bus 10A-10E is in the charging station 200. The locations of each charger 100A-100D in the charging station 200 may be known to, available to, or stored in (e.g., in a database), the charge controller 30. Comparing the known locations of chargers 100A-100D with the determined location of the buses 10A-10E, the charge controller 30 may associate each bus 10A-10E to a specific charger 100A-100D. When the number of buses 10A-10E to be charged is greater than the number of available chargers 100A-100D, the charge controller 30 may prioritize and schedule the charging of the buses 10A-10E based on the data exchanged between the mobile and fixed transceivers 20A, 20B, For example, if based on the schedule of the different buses 10A-10E, charging of one bus (e.g., bus 10E) can be delayed, charge controller 30 may schedule the charging of the buses 10A-10E such that bus 10E is only charged after another bus is charged. The charge controller 30 may use the data sent by the chargers 100A-100D to determine the status of the chargers (e.g., which charger 100A-100D is currently free, which will be soon free, etc.), and use that information to route a bus 10A-10E to a specific charger. For example, if a bus is further away from a charger (and/or if its schedule indicates that it is ahead of time), the charge controller 30 may route the bus to a charger that is currently charging another bus but will soon be free as opposed to a charger that is closer and/or currently free. Routing the buses 10A-10E in this manner may allow a bus to be charged on an urgent basis at the charger which is free.

As explained previously, in some embodiments, each bus 10A-10E may be directed to a specific charger 100A-100D based on data from the chargers 100A-100D, data from the utility company, and/or data received from the approaching buses 10A-10E, in addition to data from the transceivers 20B of the charging station 200. In some embodiments, data related to some or all of the buses 10A-10E present a charging station 200 (travelling towards a charger and/or charging at a charger in the charging station) may be used to direct a bus to a specific charge area. For example, data related to bus 10A, bus 10B, bus 10C, and bus 10D may be used to route bus 10A (bus 10B) to charger 100D.

In some embodiments, the charge controller 30 may be configured for yard management. For example, based on the data received (e.g., from the buses 10A-10E, the chargers 100A-100D, utility, etc.), the charge controller 30 may direct a bus to a charger that is open or almost done charging another bus. In some embodiments, the charge controller 30 may prioritize the charging of the different buses 10A-10E (for example, based on the schedule of the buses, if a bus is late, etc.). For example, if bus 10E is ahead of schedule, the charging of bus 10E may be delayed until a charger 100A-100D becomes free. In some embodiments, the charge controller 30 may prioritize the charging of the buses 10A-10E based on when the buses entered the charging station 200 (e.g., first in, first out, etc.). In some embodiments, the charging controller 30 may prioritize the charging based on cost (utility cost, demand chargers, etc.).

Compared to systems that rely on proximity sensors and other sensors (e.g., sensors that detect the presence of a bus near the charger only when the bus is near the charger), tracking the movement of the buses in a real-time manner (e.g., in the charging station) using UWB transceivers, and associating each bus to a suitable charger (e.g., free charger, etc.), improves efficiency of the charging process by allowing the buses to easily and repeatably dock with the chargers. As compared to some current systems that use directionally pointed WiFi signals and RFID sensors to communicate between a bus and a charger, UWB transceivers (and the UWB network) can accurately (for example, with ≤5 centimeter accuracy) track the location of the buses in the charging station 200 in real time. Since the charge controller 30 associates each bus to a suitable charger (in a charging station which has multiple chargers) as the bus approaches the charging station, and guides the bus to that charger, the bus and charger can communicate and prepare for charging (e.g., activate circuits, adjust height of pantograph, etc.) before they even dock and thus save time and make the charging event more efficient. Further, since the same UWB transceivers are used for both position sensing and communications, cost savings may be realized.

It should be noted that, although the sensors in the charging station 200 and the buses are described as UWB transceivers, this is only exemplary. In some embodiments, other sensors having similar capabilities may be used. Further, although charging of an electric bus is used to describe the current disclosure, this disclosure is not limited thereto. Rather, the systems and methods of the current disclosure may be broadly applied to any charging application (e.g., charging applications that require locating of a device in a charging area) using any type of charging infrastructure. For example, the current disclosure is applicable to charging vehicles, such as, for example, cars, trains, boats, etc. using any charging infrastructure. Aspects of the current disclosure is applicable to any charging infrastructure that requires precise positioning of a vehicle or a device with respect to a charger. Further, any type of conductive or inductive charge process may be used during charging. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of locating an electric vehicle at a charging station having multiple chargers, comprising:
   receiving, at multiple fixed transceivers positioned at different locations in the charging station, signals from one or more mobile transceivers positioned on a roof of the electric vehicle as the electric vehicle moves in the charging station;
   determining, at a controller, a current location of the electric vehicle in the charging station using the signals received by the multiple fixed transceivers;

determining, at the controller, whether the electric vehicle is located within a predetermined area of the charging station using the signals received by the multiple fixed transceivers; and as a result of determining that the electric vehicle is located within the predetermined area of the charging station, determining, at the controller, a compatibility between the electric vehicle and the charging station.

2. The method of claim 1, wherein the receiving includes receiving signals emitted by the one or more mobile transceivers positioned on the roof of the electric vehicle.

3. The method of claim 2, wherein the multiple fixed transceivers and the one or more mobile transceivers are ultra-wide band transceivers.

4. The method of claim 1, further including guiding the electric vehicle to a charger of the charging station using the signals received by the multiple fixed transceivers.

5. The method of claim 4, wherein the guiding includes displaying a map that includes the current location of the electric vehicle and a suggested path of the electric vehicle to the charger in a display device of the electric vehicle.

6. The method of claim 5, wherein the guiding includes directing the electric vehicle to the charger using audio and/or visual signals.

7. The method of claim 1, further including determining, at the controller, parameters related to charging the electric vehicle at the charger using the signals received by the multiple fixed transceivers.

8. The method of claim 1, further including activating or deactivating, using the controller, a system in the charging station or the electric vehicle based on the determined location of the electric vehicle in the charging station.

9. The method of claim 8, wherein the activating includes activating high voltage circuits to a charger.

10. A method of assigning electric vehicles to chargers at a charging station, comprising:
receiving, at multiple fixed transceivers positioned at different locations in the charging station, signals from each electric vehicle of multiple electric vehicles arriving at the charging station;
determining, at a controller, the current location of each electric vehicle of the multiple electric vehicles based on the signals received from each electric vehicle;
routing each electric vehicle to a separate charger of multiple chargers in the charging station based at least on the signals received from each electric vehicle;
determining, at the controller, whether an electric vehicle of the multiple electric vehicles is located within a predetermined area of a charger of the multiple chargers; and
as a result of determining that the electric vehicle is located within the predetermined area of the charger, determining, at the controller, a compatibility between the electric vehicle and the charger.

11. The method of claim 10, further including docking an electric vehicle of the multiple electric vehicles to a charger of the multiple chargers after the routing, and directing electric current from the charger to the electric vehicle for charging.

12. The method of claim 10, wherein determining the current location of each electric vehicle incudes determining the current location of each electric vehicle in a real-time manner.

13. The method of claim 10, wherein receiving signals from each electric vehicle includes receiving signals emitted by an ultra-wide band transceiver of the electric vehicle at multiple fixed ultra-wide band transceivers of the charging station.

14. The method of claim 10, wherein routing each electric vehicle to a separate charger includes directing an electric vehicle to a charger using audio and/or visual signals.

15. The method of claim 14, wherein directing the electric vehicle to the charger includes displaying a map that includes the current location of the electric vehicle and a suggested path of the electric vehicle to the charger in a display device on the electric vehicle.

16. A charging station, comprising:
multiple chargers configured to charge electric vehicles;
multiple fixed transceivers positioned at different locations in the charging station, wherein each fixed transceiver is configured to receive signals from each electric vehicle of the multiple electric vehicles; and
a charge controller, wherein the charge controller is configured to:
determine and track a current location of the multiple electric vehicles in the charging station based on the signals received by the multiple fixed transceivers,
prioritize charging for one or more of the multiple electric vehicles at least based on a schedule of each of the multiple electric vehicles, and
route the multiple electric vehicles to a charging station based on the prioritization.

17. The charging station of claim 16, wherein the charge controller is further configured to route the electric vehicle to a charger of the multiple chargers based at least on the signals received from the electric vehicle.

18. The charging station of claim 17, wherein routing the electric vehicle to the charger includes displaying a map that includes the current location of the electric vehicle and a suggested path of the electric vehicle to the charger in a display device on the electric vehicle.

19. The charging station of claim 16, wherein the multiple fixed transceivers are ultra-wide band transceivers.

* * * * *